United States Patent
Hu et al.

(10) Patent No.: US 9,612,514 B2
(45) Date of Patent: Apr. 4, 2017

(54) LIGHT-EMITTING DEVICE AND RELATED PROJECTION SYSTEM

(71) Applicant: APPOTRONICS CORPORATION LIMITED, Shenzhen (CN)

(72) Inventors: Fei Hu, Shenzhen (CN); Haixiong Hou, Shenzhen (CN); Liangliang Cao, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 8 days.

(21) Appl. No.: 14/652,426

(22) PCT Filed: Dec. 23, 2013

(86) PCT No.: PCT/CN2013/090216
§ 371 (c)(1),
(2) Date: Jun. 15, 2015

(87) PCT Pub. No.: WO2014/101730
PCT Pub. Date: Jul. 3, 2014

(65) Prior Publication Data
US 2016/0085141 A1    Mar. 24, 2016

(30) Foreign Application Priority Data
Dec. 28, 2012    (CN) .................... 2012 1 05803996

(51) Int. Cl.
*G03B 21/20* (2006.01)
*H04N 9/31* (2006.01)
(Continued)

(52) U.S. Cl.
CPC .............. *G03B 21/208* (2013.01); *F21V 5/04* (2013.01); *F21V 13/02* (2013.01);
(Continued)

(58) Field of Classification Search
CPC .............. G03B 21/204; G03B 21/2033; G03B 21/2013; G03B 21/208; H04N 9/3152; H04N 9/3161; H04N 9/3164; H04N 9/317
See application file for complete search history.

(56) References Cited

U.S. PATENT DOCUMENTS 8,585,208 B2    11/2013    Akiyama
2012/0008098 A1    1/2012    Akiyama
(Continued)

FOREIGN PATENT DOCUMENTS

CN    102681310    9/2012
CN    102707552    10/2012
(Continued)

OTHER PUBLICATIONS

International Search Report in the parent PCT application No. PCT/CN2013/090216, dated Mar. 20, 2014.
(Continued)

*Primary Examiner* — William C Dowling
*Assistant Examiner* — Ryan Howard
(74) *Attorney, Agent, or Firm* — Chen Yoshimura LLP

(57) ABSTRACT

A light-emitting device and a related projection system. Light-emitting devices (300, 400) comprise: a light source unit (1) and focusing lenses (330, 430). The light source unit (1) comprises laser units (310, 410) and collimating lenses (320, 420) corresponding to the laser units (310, 410). The light-emitting surface of the laser units (310, 410) is a rectangle, and the light divergence angle of laser passing through the cross-section of the long side of the rectangle is smaller than the light divergence angle of same passing through the cross-section of the short side of the rectangle. The collimating lenses (320, 420) are used for focusing the laser from the laser units (310, 410) on a target surface to (Continued)

form a predetermined light spot. The laser units (310, 410) are located on the light axis of the collimating lenses (320, 420) in a predetermined position deviating from the focal point thereof, so that the predetermined light spot has a predetermined length-width ratio. The light-emitting device and the related projection system have the advantages of relatively small regulation quantity and relatively high assembly efficiency.

19 Claims, 5 Drawing Sheets

(51) Int. Cl.
  *G02B 27/09* (2006.01)
  *F21V 5/04* (2006.01)
  *F21V 13/02* (2006.01)
  *G02B 26/00* (2006.01)
(52) U.S. Cl.
  CPC ..... *G02B 27/0905* (2013.01); *G02B 27/0955* (2013.01); *G03B 21/204* (2013.01); *G03B 21/2013* (2013.01); *G03B 21/2033* (2013.01); *G02B 26/008* (2013.01); *H04N 9/3161* (2013.01)

(56) References Cited

U.S. PATENT DOCUMENTS

| 2012/0236264 A1 | 9/2012 | Akiyama |
| 2012/0249973 A1 | 10/2012 | Miura |

FOREIGN PATENT DOCUMENTS

| JP | 2006072220 | 3/2006 |
| JP | 2012118302 | 6/2012 |
| TW | 201205184 | 2/2012 |

OTHER PUBLICATIONS

IPRP in the parent PCT application No. PCT/CN2013/090216, dated Jun. 30, 2015.

Fi. 4a

LIGHT-EMITTING DEVICE AND RELATED PROJECTION SYSTEM

BACKGROUND OF THE INVENTION

Field of the Invention

This invention relates to illumination and display technologies, and in particular, it relates to a light-emitting device and related projection system.

Description of the Related Art

Because lasers have the advantages of high brightness and high color purity, they have been widely used in illumination and display technology areas in recent years.

The light distribution of a laser beam is typically an elliptical Gaussian distribution, and the ratio of the major axis to the minor axis is typically large, such as 10:1. In some practical applications, however, the light spot of a light source are required to be a rectangle of a specific aspect ratio. For example, in display technologies, the display screens typically have an aspect ratio of 4:3 or 16:9. Thus, laser beams cannot be directly used as the display light source; light beams from multiple lasers have to be combined using lenses so that the light spots from the multiple lasers are fit together to form a light spot of an aspect ratio of 4:3 or 16:9.

For example, refer to FIGS. 1a and 1b, where FIG. 1a is a plan view of a conventional light source for a projection system, and FIG. 1b illustrates the light spots on the phosphor material in FIG. 1a. As shown in FIGS. 1a and 1b, the conventional light source for the projection system includes multiple laser units 11, multiple collimating lenses 12, a focusing lens 13, a phosphor material 14, a base plate 15, and a motor 16. The base plate 15 is affixed to and driven by the motor. The phosphor material 14 has a ring shape coaxial with the base plate 15 and is disposed directly in contact with it. The laser beams emitted by the laser units 11 are collimated by the corresponding collimating lenses 12 onto the focusing lens 13, and focused by the focusing lens 13 onto the phosphor material 14 to excite the phosphor material 14. The multiple laser units are divided into eight groups, the light spots of all laser units within each group overlap with each other on the phosphor material 14. The laser beams emitted by the eight groups of laser units form eight non-overlapping light spots 17a, which collectively form a predetermined light spot in the rectangular area 17 on the phosphor material 14 (the target plane).

Because multiple light spots are required to be combined to form the predetermined light spot, for each group of laser units, at least one of each laser units 11 and their corresponding collimating lenses 12 need to be adjusted during assembly, to ensure that the light spot formed by each group of laser units 11 on the phosphor material is located at the corresponding predetermined position. This affects the efficiency of assembly and increases assembly cost.

SUMMARY OF THE INVENTION

An object of the present invention is to provide a light source device and related projection system that at least requires less adjustment and hence has higher assembly efficiency.

An embodiment of the present invention provides an illumination device having a light emitting device, which includes at least one light source unit, the light source unit including a laser unit and a collimating lens corresponding to the laser unit, wherein a light emitting surface of the laser unit is a rectangle, wherein a divergence angle of a laser light emitted by the laser unit in a cross-section that goes through a long side of the rectangle is less than a divergence angle of the laser light in a cross-section that goes through a short side of the rectangle; and a focusing lens, wherein the collimating lens collimates the laser light emitted by the laser unit onto the focusing lens, and the focusing lens focuses the laser light from the collimating lens onto a target plane to form a predetermined light spot, wherein the laser unit is located on an optical axis of the collimating lens at a position away from a focal point of the collimating lens, wherein the predetermined light spot has a predetermined aspect ratio.

The light emitting device may include a group of light source units, the group including a plurality of light source units; wherein the focusing lens focuses the laser light emitted by the plurality of light source units of the group to a common position on the target plane to form the predetermined light spot.

The light emitting device may include two groups of light source units, each group including a plurality of light source units, wherein the focusing lens focuses the laser light emitted by the plurality of light source units of each of the two groups to a common position on the target plane to respectively form two individual light spots, and wherein the two individual light spots collectively form the predetermined light spot.

The light emitting device may further include a light combination device that has transmitting parts and reflecting parts, wherein the laser light emitted by the first one of the two groups of light source units passes through the light transmitting parts to reach the focusing lens, and the laser light emitted by a second one of the two groups of light source units is reflected by the light reflecting parts to reach the focusing lens.

The light combination device may be a reflecting minor having slits or a transmitting plate having reflective strips.

The light emitting device may further include an angle adjusting mechanism for adjusting the light combination device to change an incident angle of the laser light emitted by the second one of the two groups of light source units onto the reflecting parts of the light combination device.

In the light emitting device, a distance between the laser unit and the corresponding collimating lens is less than a focal distance of the corresponding collimating lens.

The light emitting device may further include a position adjusting mechanism, for moving the collimating lens linearly along its optical axis.

The light emitting device may further include a wavelength conversion layer, wherein the target plane is located at the wavelength conversion material.

Embodiments of the present invention also provide projection system which includes the above light emitting device.

Compared to conventional technologies, embodiments of the present invention have the following advantages:

By placing the laser unit at a position away from the focal point of the collimating lens, the laser beam forms a predetermined light spot of predetermined aspect ratio on the target plane. Thus, when a single predetermined light spot fills the entire predetermined rectangular area, only a single group of laser units or even only a single laser unit can be used to form the predetermine light spot; it is not necessary to use multiple groups of light source units to form multiple non-overlapping light spots. Thus, the step of adjusting the groups of laser units in conventional technology can be omitted. Even when the light spot formed by one group of laser units cannot fill the entire rectangular area, because the light spot size is larger when the laser unit is off-focus as compared to when it is located at the focal point, embodiments of the present invention still has the advantage that fewer non-overlapping light spots are required to fill the entire rectangular area, and therefore fewer groups of laser units are required as compared to conventional technology. Therefore, less adjustment of the groups of laser units or collimating lenses is required. It can be seen that embodiments of the present invention have the advantage of less adjustment and higher assembly efficiency.

BRIEF DESCRIPTION OF THE DRAWINGS

FIG. 1b illustrates the light spots on the phosphor material in FIG. 1a;

FIG. 2b illustrates the light beam emitted by the laser unit of FIG. 2a;

FIG. 3b illustrates the light spot formed on the target plane in the embodiment of FIG. 3a;

FIG. 4a is a plan view of a light emitting device according to another embodiment of the present invention;

FIG. 4b illustrates the light spot formed on the target plane in the embodiment of FIG. 4a;

FIG. 5b is a left-side view of the light combination device of the embodiment of FIG. 5a.

DETAILED DESCRIPTION OF THE PREFERRED EMBODIMENTS

For clarity, technical terms used in this disclosure and the figures are defined below:

Aspect ratio: The ratio of the major axis to the minor axis of an ellipse, or the length to width ratio of a rectangle.

It is generally believed by those in the relevant technical field that, regardless of whether a laser unit is placed at the focal point of the collimating lens or placed on the optical axis of the collimating lens but away from the focal point, the laser light emitted by the laser unit will form a light spot on the target plane that has a shape similar to that of the light emitting surface of the laser unit.

Figure 2A:
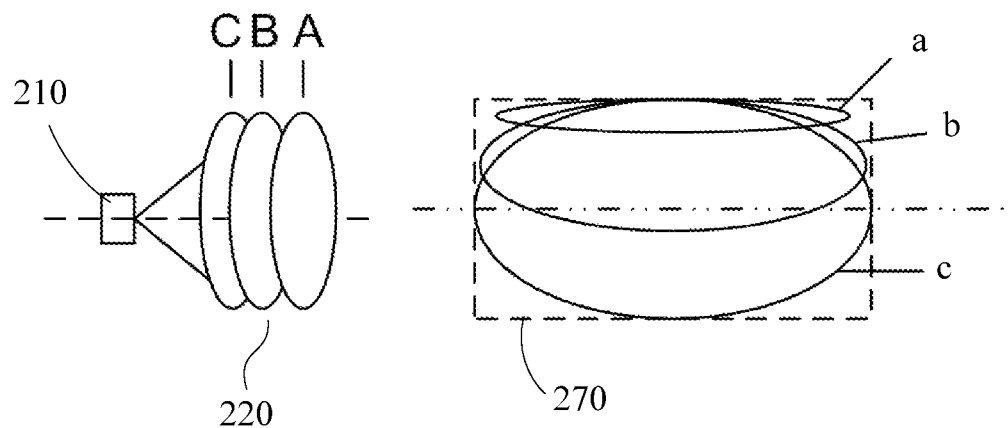
FIG. 2a illustrates a structure when the laser unit is located at the focal point of the collimating lens and when it is located away from the focal point.

However, the inventors of the present invention discovered through experimentation that, when some laser units are placed on the optical axis of the collimating lens but away from the focal point, the shape of the light spot formed on the target plane by the laser light emitted from the laser unit is dissimilar to the shape of the light spot formed when the laser unit is located at the focal point. Refer to FIG. 2a, which shows the structure of the laser unit being located at the focal point of the collimating lens and away from the focal point, as well as the corresponding elliptical light spots formed on the target plane.

As shown in FIG. 2a, when the laser unit 210 is exactly located at the focal point of the collimating lens 220, i.e. when the collimating lens 220 is at position A along the optical axis, the light spot formed on the target plane by the collimating lens 220 and after passing through a focusing lens (not shown) is a thin and long ellipse a. When the laser unit 210 is located on the optical axis of the collimating lens 220 but away from the focal point, e.g. when the collimating lens 220 is at position B which is closer to the laser unit 210 than position A, the light spot formed on the target plane by the collimating lens 220 and after passing through the focusing lens is an ellipse b, where the aspect ratio of light spot b is smaller than that of the light spot a. When the laser unit 210 is located at position C which is even closer to the laser unit 210 than position B, the light spot formed on the target plane by the collimating lens 220 and after passing through the focusing lens is an ellipse c, where the aspect ratio of light spot c is smaller than that of the light spot b. Moreover, the light spot c almost fills the entire predetermined rectangular area 270 on the target plane.

Figure 2B:
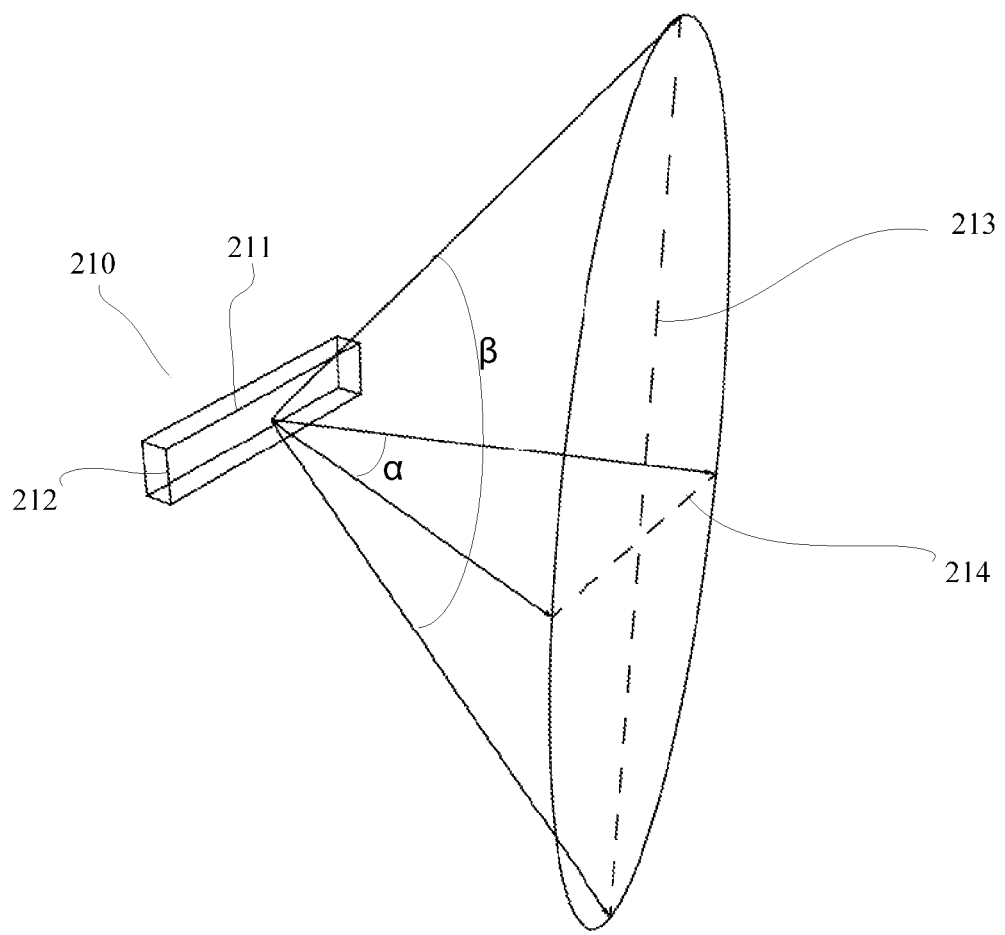

Empirical studies by the inventors reveal that, some types of laser units have the effect that when the laser unit is located on the optical axis of the collimating lens but away from the focal point (referred to as "off-focus" hereinafter), the elliptical light spots formed on the target plane will have different aspect ratios, and such laser units typically have the following characteristics: The light emitting surface of the laser unit is rectangular, and the divergence angle of the emitted light beam in a cross-section that goes through the long side of the rectangle is less than the divergence angle in a cross-section that goes through the short side of the rectangle. The inventors' theoretical analysis of this empirical result reveals that the reasons that such laser units can form elliptical light spots of different aspect ratios on the target plane are as follows: As shown in FIG. 2b, the light emitting surface of the laser unit 210 is rectangular, its divergence angle in a cross-section that goes through the long side 211 of the rectangle is $\alpha$, and its divergence angle in a cross-section that goes through the short side 212 of the rectangle is $\beta$. Because $\alpha$ is smaller than $\beta$, when the laser unit is placed off-focus, the major axis 213 of the laser beam distribution increases faster than the minor axis 214, causing the minor axis of the elliptical light spot on the target plane (not shown) to increase faster than the major axis of the light spot, which changes the aspect ratio of the elliptical light spot.

It can be seen that, by placing the laser unit on the optical axis of the collimating lens at a position away from the focal point, the aspect ratio of the elliptical light spot formed on the target plane can be changed, thereby achieving a desired aspect ratio. Based on this discovery, the inventors invented a light emitting device, which includes:

A light source unit, which includes a laser unit and a collimating lens corresponding to the laser unit. The light-emitting surface of the laser unit is a rectangle, and the divergence angle of the emitted laser light in a cross-section that goes through the long side of the rectangle is less than the divergence angle in a cross-section that goes through the short side of the rectangle. The collimating lens collimates the laser light emitted by the laser unit onto a focusing lens.

A focusing lens, for focusing the laser light from the collimating lens onto a target plane to form a predetermined light spot.

The laser unit is located on the optical axis of the corresponding collimating lens at a position away from the focal point of the collimating lens, such that the predetermined light spot has a predetermined aspect ratio.

Compared to conventional technologies, embodiments of the present invention place the laser unit at a position away from the focal point of the collimating lens, so that the laser beam forms a predetermined light spot of predetermined aspect ratio on the target plane. Thus, when a single predetermined light spot fills the entire predetermined rectangular area, only a single group of laser units or even only a single laser unit can be used to form the predetermine light spot; it is not necessary to use multiple groups of light source units to form multiple non-overlapping light spots. Thus, the step of adjusting the groups of laser units in conventional technology can be omitted. Even when the light spot formed by one group of laser units cannot fill the entire rectangular area, because the light spot size is larger when the laser unit is off-focus as compared to when it is located at the focal point, embodiments of the present invention still has the advantage that fewer non-overlapping light spots are required to fill the entire rectangular area, and therefore fewer groups of laser units are required as compared to conventional technology. Therefore, less adjustment of the groups of laser units or collimating lenses is required. It can be seen that embodiments of the present invention have the advantage of less adjustment and higher assembly efficiency.

Embodiments of the present invention are described below in more detail with reference to the drawings.

First Embodiment

Figure 3A:
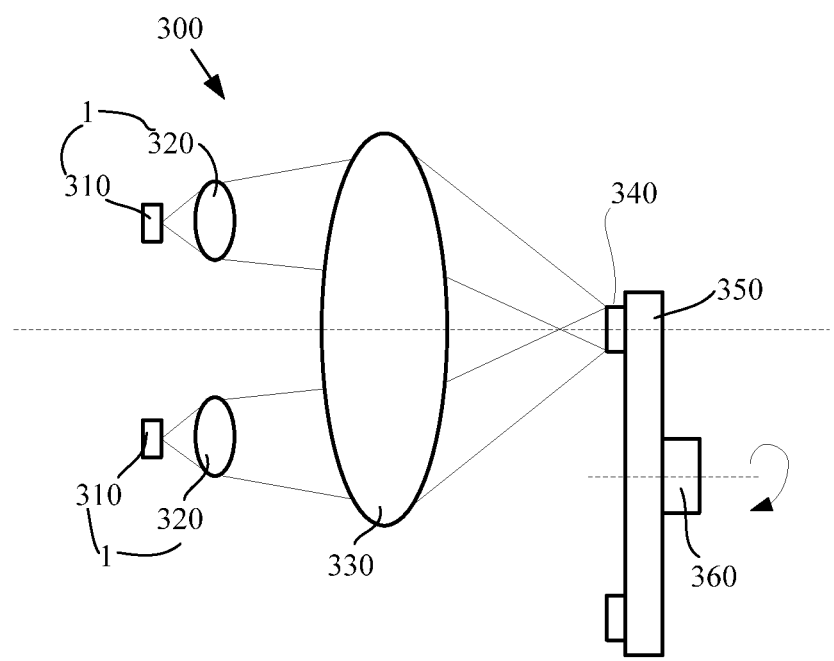
FIG. 3a is a plan view of a light emitting device according to an embodiment of the present invention.
Figure 3B:
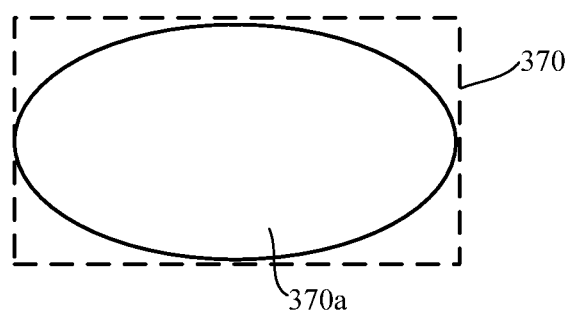

Refer to FIGS. 3a and 3b, where FIG. 3a is a plan view of a light emitting device according to an embodiment of the present invention, and FIG. 3b illustrates the light spot formed on the target plane in the embodiment of FIG. 3a. As shown in FIG. 3a, the light emitting device 300 includes light source units 1, a focusing lens 330, and a wavelength conversion layer 340. Each light source unit 1 includes a laser unit 310 and a collimating lens 320 corresponding to the laser unit.

The laser units 310 may be any type of laser units that generate light of any color. For example, the laser units 310 may be laser diodes that generate blue, green or red light.

Each laser unit 310 has a corresponding collimating lens 320, for collimating the light from the laser unit 310 to the focusing lens 330. The collimating lens 320 is preferably an aspherical collimating lens, which has superior collimating properties. The collimating lens 320 may also be a spherical collimating lens of free-curve-surface collimating lens.

In this embodiment, the light emitting device 300 includes one light source unit group which includes multiple light source units 1. Also, the target plane is located on the wavelength conversion material layer 340. The focusing lens 330 focuses the laser beams from all of the multiple light source units 1 to the same light spot position on the target plane to form the predetermined light spot 370a; in other words, the laser light emitted by all of the multiple light source units in a group are superimposed on the target plane to form the predetermined light spot 370a. The predetermined light spot 370a almost fills the entire predetermined rectangular area 370, and its aspect ratio is approximately equal to the aspect ratio of the rectangular area.

Figure 1A:
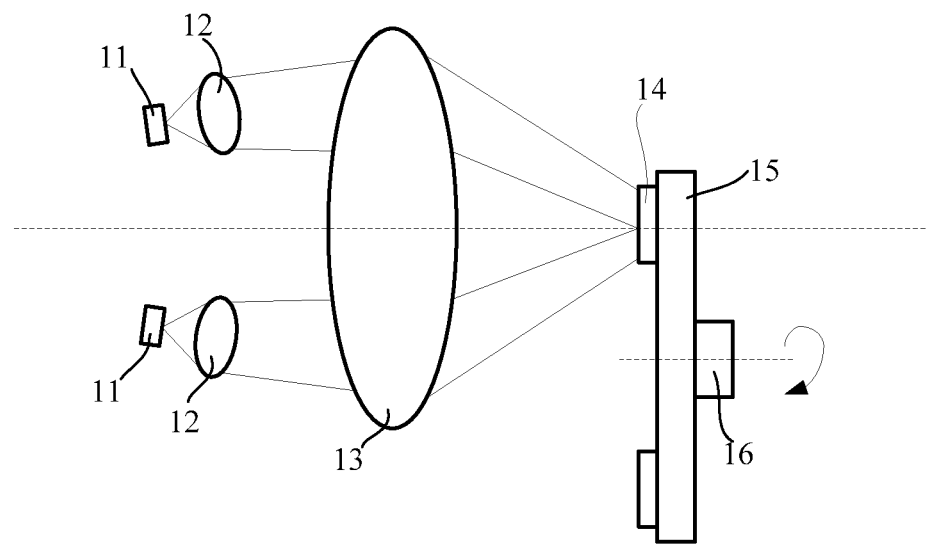
FIG. 1a is a plan view of a conventional light source for a projection system.
Figure 1B:
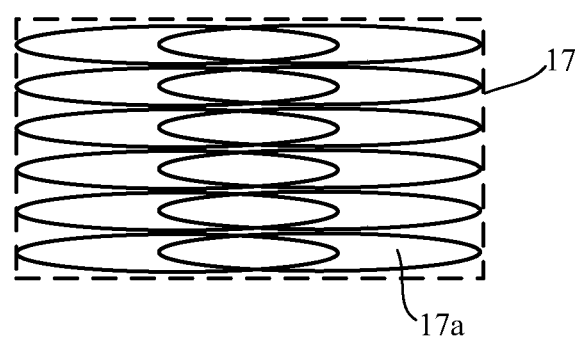

In this embodiment, the rectangular area 370 is the same as the rectangular area 17 in FIG. 1b, and the configurations of the various optical components are also similar to those of FIG. 1a. Assuming that the aspect ratio of each single light spot in FIG. 1b is a:b, and the ratio of the length of the rectangular area 17 to the length of each single light spot is 1.5; then in the instant embodiment, by placing the laser units off-focus, each single light spot fills the entire rectangular area 370. From FIG. 1b and FIG. 3b together, it can be seen that the aspect ratio of the single light spot in this embodiment is (1.5a)/(6b)=a/(4b). Thus, it can be seen that in this embodiment, by placing the laser units off-focus, the aspect ratio of the single light spots is reduced by 4 times.

In this embodiment, because the individual light spot formed by each light source unit 1 fills the entire predetermined rectangular area, only a single group of laser units or even only a single laser unit can be used to form the predetermine light spot 370a; it is not necessary to use multiple groups to form multiple non-overlapping light spots. Thus, the step of adjusting each group of laser units in the conventional technology can be omitted and higher assembly efficiency is achieved.

Preferably, the light source units 1 of each group of light source units are the same; after the distance between the laser units 310 and corresponding collimating lenses 320 is calculated based on the aspect ratio of the predetermined light spot, all light source units 1 of the group can be mounted on a common base to form a light source module. Thereafter, only the light source module and the focusing lens 330 need to be adjusted, significantly reducing assembly cost.

In this embodiment, the laser units 310 emit a blue light. The wavelength conversion material layer 340 is a phosphor material, such as YAG phosphor, which absorbs the blue excitation light and emits a yellow converted light. The wavelength conversion material layer 340 may also use other wavelength conversion materials, such as quantum dots, fluorescent dye, etc., in addition to phosphors. Often, phosphor materials are a powder or particulate form and it is difficult to form a layer by themselves. Thus, an adhesive may be used to adhere the phosphor powder or particles together to form a plate. A commonly used method is to disperse phosphor powder in an adhesive material, and use the adhesive material as a carrier to carry the phosphor powder and form a plate.

Because phosphor layers are often brittle and fragile, preferably, the light emitting device 300 additionally includes a base plate 350 for carrying the wavelength conversion material layer 340. Specifically, the wavelength conversion material layer 340 may be glued to or coated onto the base plate 350. Of course, when the wavelength conversion material layer has sufficient mechanical strength, for example when the wavelength conversion material layer is formed by mixing a phosphor powder in a transparent glass which has sufficient mechanical strength, the base plate can be omitted.

Further, the base plate 350 is a round plate, and the wavelength conversion material layer 340 is a ring shape concentric with the base plate 350. The light emitting device 300 further includes a drive device 360, fixedly connected to the base plate 350, to drive the base plate 350 to rotate around its axis, so that the light spot formed by the laser beam from the focusing lens 330 illuminates the wavelength conversion material layer 340 along a predetermined circular path. This prevents the problem of temperature rise of the phosphor material caused by the laser light illuminating the same position of the phosphor material for extended periods of time. It should be understood that the drive device 360 and the wavelength conversion material layer 340 can be mechanically coupled in other ways, so long as the light spot formed by the laser beam from the focusing lens 330 illuminates different parts of the phosphor material at different times. For example, the wavelength conversion material layer can be a strip shape and the drive device 360 can drive the base plate to oscillate linearly along the direction of the strip.

Second Embodiment

Figure 4B:
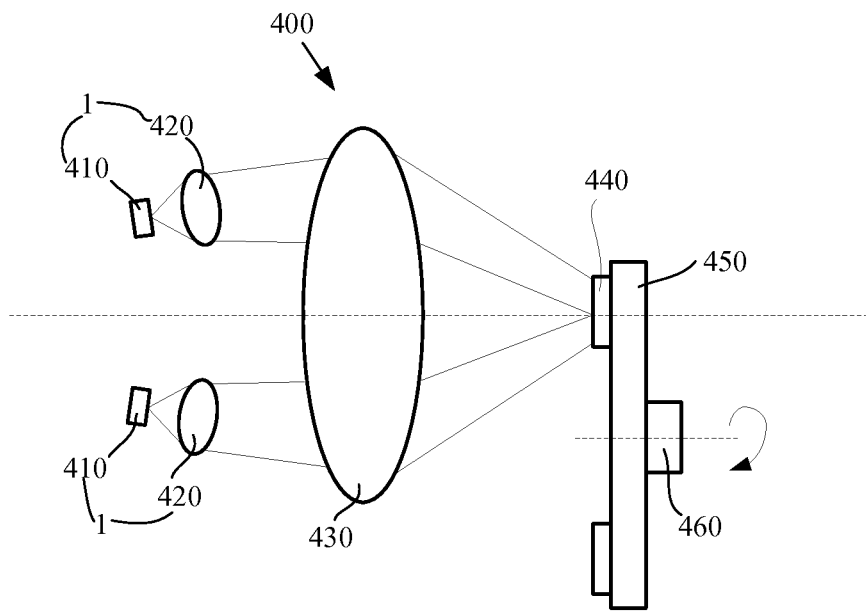
Figure 4B:
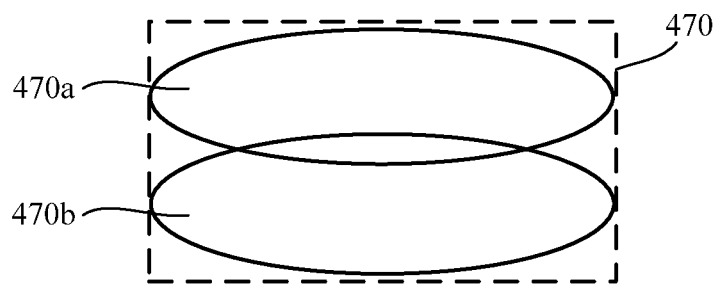

The light emitting device may also include two groups of light source units, forming two non-overlapping light spots on the target plane, which are combined to form the predetermined light sport. Specifically, refer to FIGS. 4a and 4b, where FIG. 4a is a plan view of a light emitting device according to the second embodiment of the present invention and FIG. 4b illustrates the light spot formed on the target plane in the embodiment of FIG. 4a. As shown in FIG. 4a, the light emitting device 400 includes light source units 1, a focusing lens 430, a wavelength conversion layer 440, a base plate 450 and a drive device 460. Each light source unit 1 includes a laser unit 410 and a collimating lens 420 corresponding to the laser unit.

Differences between this embodiment and the embodiment of FIG. 3a include:

The light emitting device 400 includes two groups of light source units, each group including multiple light source units 1. Further, the focusing lens 430 focuses the light beams from the multiple light source units within the same group to a common light spot position on the target plane, and focuses the light beams from the two groups of light source units respectively to two light spot positions 470a and 470b. The two light spots 470a and 470b are combined to form the predetermined light spot, which almost fills the entire predetermined rectangular area 470. The aspect ratio of the predetermined light spot is approximately equal to the aspect ratio of the predetermined rectangular area.

In this embodiment, although the light spot formed by one group of light source units cannot fill the entire rectangular area, because the light spot size when the laser units are off-focus is larger than that when the laser units are located at the focal point of the collimating lenses, this embodiment requires fewer light spots to fill the entire rectangular area and therefore fewer groups of laser units as compared to the conventional technology. Thus, the amount of required adjustment of the laser units or collimating lenses in the groups of light source units is reduced.

Further, as shown in FIG. 4b, the two light spots formed by the two groups of light source units on the target plane have the same shape and size, and they overlap partially in their edge areas. Because the light intensity in the edge areas of the light spots is lower than in the center areas, the partial overlap of the two light spots in the edge areas improves the intensity uniformity of the combined predetermined light spot.

Because two light spots formed by the two groups of light source units have the same shape and size, the configurations of the two groups of light source units can be the same, and the light source units of the two groups can be respectively mounted on two bases to form two identical light source modules. Thereafter, only the angles of the bases of the two light source modules relative to the focusing lens need to be adjusted to achieve the result that the two light spots generated by the two groups of light source units are located at the two different predetermined positions on the target plane.

Third Embodiment

To more conveniently adjust the two groups of light source units in the embodiment of FIGS. 4a and 4b, the light emitting device may additionally include a light combination device that has transmitting parts and reflecting parts. Of the two groups of light source units, the laser beams outputted by the first group passes through the light transmitting parts to reach the focusing lens, and the laser beams outputted by the second group is reflected by the light reflecting parts to reach the focusing lens, so as to be combined with the output light of the first group into one beam. By simply adjusting the angle between the light combination device and the focusing lens, the angle of the laser light reflected by the reflecting parts can be adjusted, which changes the relative positions of the light spots on the target plane formed by the reflected laser light and the transmitted laser light.

Figure 5A:
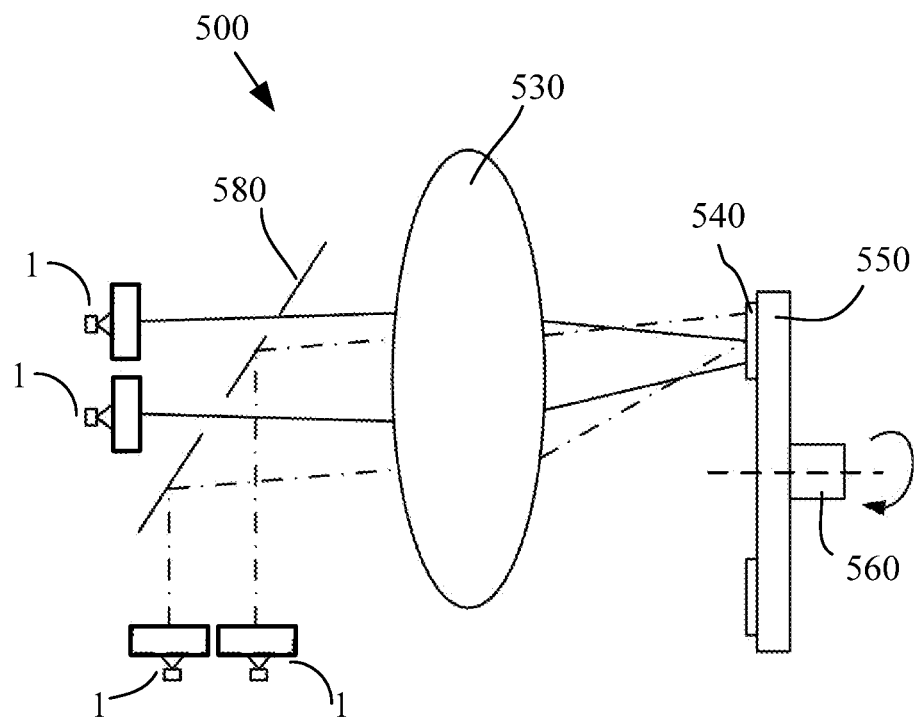
FIG. 5a is a plan view of a light emitting device according to another embodiment of the present invention.
Figure 5B:
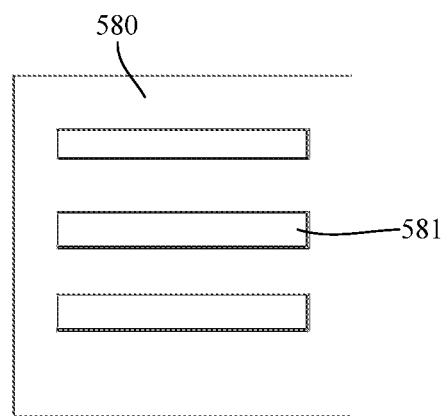

More specifically, refer to FIGS. 5a and 5b, where FIG. 5a is a plan view of a light emitting device according to the third embodiment of the present invention, and FIG. 5b is a left-side view of the light combination device of the embodiment of FIG. 5a. As shown in FIG. 5a, the light emitting device 500 includes light source units 1, a focusing lens 530, a wavelength conversion material layer 540, a base plate 550 and a drive device 560.

Differences between this embodiment and the embodiment of FIG. 4a include:

The light emitting device 500 additionally includes a light combination device 580. As shown in FIG. 5b, the light combination device 580 is a reflecting minor having slits 581. Of the two groups of light source units, the laser light emitted by the first group passes through the slits 581 to reach the focusing lens 530, and the laser light emitted by the second group is reflected by the areas of the reflecting mirror other than the slits 581 to reach the focusing lens 530, so that the laser light emitted by the two groups of light source units are combined into one beam. As discussed above, by simply adjusting the angle of the reflecting mirror 580 relative to the focusing lens 530, the combination of the two light spots can be adjusted to form the predetermined light spot. Moreover, by using the reflecting minor 580 to combine the laser light from the two groups of light source units, the light spot formed by the combined light from the two groups can be compressed.

It should be understood that, in other embodiments, the light combination device may be a light transmitting plate having reflective strips. In such a case, of the two groups of light source units, the laser light from the first group is reflected by the reflective strips to reach the focusing lens, and the laser light from the second group is transmitted through the areas of the transmitting plate other than the strips to reach the focusing lens.

Further, the light emitting device may also include an angle adjusting mechanism, to adjust the light combination device in order to change the incident angle of the laser light from the second group of light source units onto the reflecting parts of the light combination device. For example, the angle adjusting mechanism may rotate the reflecting minor 580 to change the incident angle of the laser light incident on the reflecting parts of the reflecting mirror 580. This allows adjustment of the combined light spot formed on the target plane by the two light spots based on the user's needs.

In these embodiments, the detailed mechanism of how to place the laser units away from the focal point of the collimating lens is explained below. Preferably, the collimating lens is moved toward the laser unit from the ideal collimating position (i.e. the position where the laser unit is located at the focal point of the collimating lens), i.e., the distance between the laser unit and the corresponding collimating lens is less than the focal distance of the collimating lens. At this position, the light collecting angle of the collimating lens is larger, so the light utilization efficiency is higher. The distance of the laser unit from the focal point should not be too large;

preferably, the difference between the off-focus collimating lens position and the ideal collimating lens position is less than 0.5 mm.

Further, the light emitting device may include a position adjusting mechanism, which can move the collimating lens linearly along its optical axis, to adjust the aspect ratio of the light spot formed by laser light of the laser unit on the target plane based on the user's needs.

In this disclosure, the various embodiments are described progressively, where later embodiments are described by emphasizing its differences form earlier embodiments. For similarities among the various embodiment, the embodiments can refer to each other.

Another embodiment of the present invention is a projection system, which includes a light emitting device having structures and functions of the above-described embodiments. The projection system can employ various projection technologies, such as LCD (liquid crystal display) projection technology, DLP (digital light processor) projection technology, etc. Further, the above-described light emitting devices may be used in illumination systems such as stage lighting.

It will be apparent to those skilled in the art that various modification and variations can be made in the apparatus and method of the present invention without departing from the spirit or scope of the invention. Thus, it is intended that the present invention cover modifications and variations that come within the scope of the appended claims and their equivalents.

What is claimed is:

1. A light emitting device, comprising:
at least one light source unit, which includes a laser unit and a collimating lens corresponding to the laser unit, wherein a light emitting surface of the laser unit is a rectangle, wherein a divergence angle of a laser light emitted by the laser unit in a cross-section that goes through a long side of the rectangle is less than a divergence angle of the laser light in a cross-section that goes through a short side of the rectangle; and
a focusing lens, wherein the collimating lens converges the laser light emitted by the laser unit and directs it onto the focusing lens, and the focusing lens focuses the laser light from the collimating lens onto a target plane to form a predetermined light spot,
wherein the laser unit is located on an optical axis of the collimating lens at a position away from a focal point of the collimating lens, wherein the predetermined light spot has a predetermined aspect ratio, and wherein a distance between the laser unit and the focal point of the collimating lens is determined based on the predetermined aspect ratio.

2. The light emitting device of claim 1, comprising a group of light source units, the group including a plurality of light source units;
wherein the focusing lens focuses the laser light emitted by the plurality of light source units of the group to a common position on the target plane to form the predetermined light spot.

3. The light emitting device of claim 1, comprising two groups of light source units, each group including a plurality of light source units;
wherein the focusing lens focuses the laser light emitted by the plurality of light source units of each of the two groups to a common position on the target plane to respectively form two individual light spots, and wherein the two individual light spots collectively form the predetermined light spot.

4. The light emitting device of claim 3, further comprising a light combination device that has transmitting parts and reflecting parts,
wherein the laser light emitted by the first one of the two groups of light source units passes through the light transmitting parts to reach the focusing lens, and the laser light emitted by a second one of the two groups of light source units is reflected by the light reflecting parts to reach the focusing lens.

5. The light emitting device of claim 4, wherein the light combination device is a reflecting minor having slits or a transmitting plate having reflective strips.

6. The light emitting device of claim 4, further comprising an angle adjusting mechanism for adjusting the light combination device to change an incident angle of the laser light emitted by the second one of the two groups of light source units onto the reflecting parts of the light combination device.

7. The light emitting device of claim 1, wherein a distance between the laser unit and the corresponding collimating lens is less than a focal distance of the corresponding collimating lens.

8. The light emitting device of claim 1, further comprising a position adjusting mechanism, for moving the collimating lens linearly along its optical axis.

9. The light emitting device, of claim 1, further comprising a wavelength conversion layer, wherein the target plane is located at the wavelength conversion layer.

10. A projection system, comprising the light emitting device of claim 1.

11. A method of generating a predetermined light spot, comprising:
providing at least one laser unit, each laser unit emitting a laser light beam, wherein a light emitting surface of each laser unit is a rectangle, wherein a divergence angle of the laser light emitted by each laser unit in a cross-section that goes through a long side of the rectangle is less than a divergence angle of the laser light in a cross-section that goes through a short side of the rectangle;
providing at least one collimating lens corresponding to the at least one laser unit, wherein each of the at least one laser unit is located on an optical axis of the corresponding collimating lens at a distance away from a focal point of the collimating lens, the collimating lens converging the laser light beam emitted by the corresponding laser unit; and
providing a focusing lens to receive the laser light beam from the at least one collimating lens and to focus the laser light beam onto a target plane to form the predetermined light spot,
wherein the predetermined light spot has a predetermined aspect ratio, and wherein the distance between each of the at least one laser unit and the focal point of the corresponding collimating lens is determined based on the predetermined aspect ratio of the predetermined light spot.

12. The method of claim 11,
wherein the at least one laser unit comprises a group of laser units, the group including a plurality of laser units, and wherein the at least one collimating lens comprises a group of collimating lenses, the group including a plurality of collimating lens, and
wherein the focusing lens focuses the laser light from the plurality of collimating lenses to a common position on the target plane to form the predetermined light spot.

13. The method of claim 11,
wherein the at least one laser unit comprises two groups of laser units, each group including a plurality of laser units, and wherein the at least one collimating lens comprises two groups of collimating lenses, each group including a plurality of collimating lens, and
wherein the focusing lens focuses the laser light from the plurality of collimating lenses of each of the two groups of collimating lenses to a common position on the target plane to respectively form two individual light spots, and wherein the two individual light spots collectively form the predetermined light spot.

14. The method of claim 13, further comprising:
providing a light combination device that has transmitting parts and reflecting parts;
passing the laser light from a first one of the two groups of collimating lenses through the light transmitting parts to reach the focusing lens; and
reflecting the laser light from a second one of the two groups of collimating lenses by the light reflecting parts to reach the focusing lens.

15. The method of claim 14, wherein the light combination device is a reflecting mirror having slits or a transmitting plate having reflective strips.

16. The method of claim 14, further comprising:
adjusting the light combination device to change an incident angle of the laser light from the second one of the two groups of collimating lenses onto the reflecting parts of the light combination device.

17. The method of claim 1, wherein the distance between the laser unit and the corresponding collimating lens is less than a focal distance of the corresponding collimating lens.

18. The method of claim 1, further comprising:
moving each of the at least one collimating lens linearly along its optical axis.

19. The method of claim 1, further comprising:
providing a wavelength conversion layer, wherein the target plane is located at the wavelength conversion layer.

* * * * *